Oct. 27, 1964
H. G. KLEMMETSEN  3,153,931
LIQUID VOLUME MEASURING ARRANGEMENT
Filed July 15, 1963
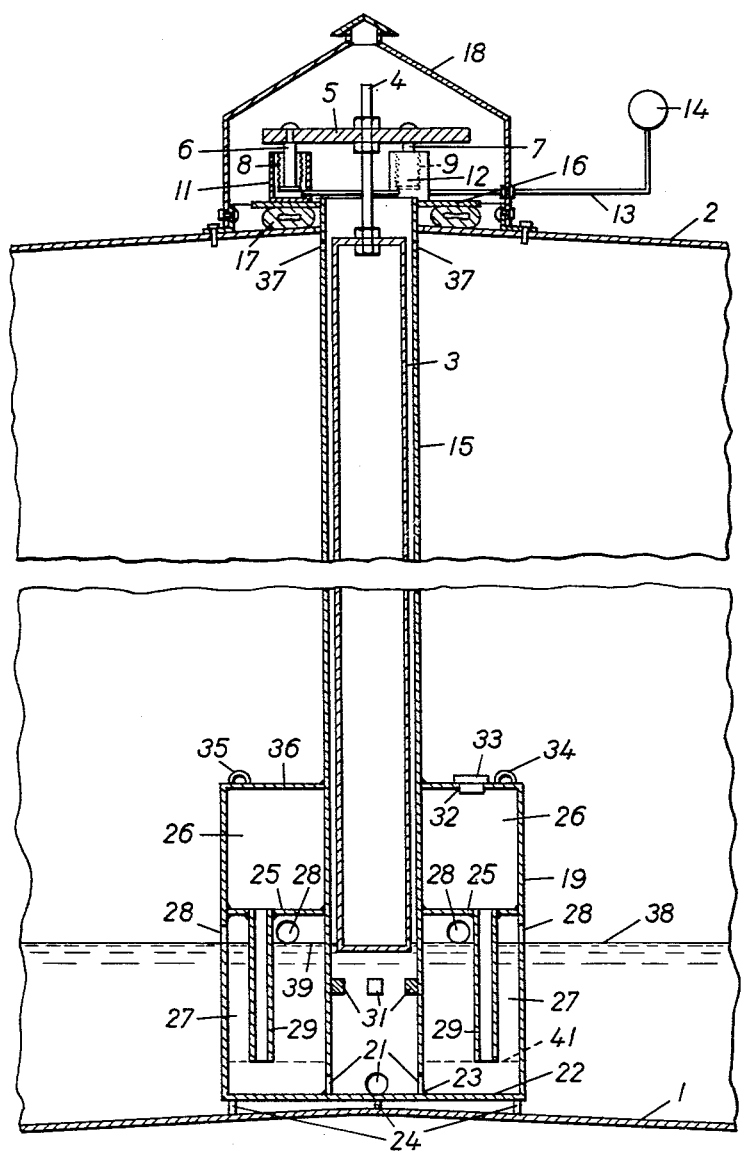
Inventor
Harald Gohn Klemmetsen
by
Michael S. Striker
Atty

3,153,931
LIQUID VOLUME MEASURING ARRANGEMENT
Harald G. Klemmetsen, Tyristubbveien 5, Bryn, Oslo, Norway, assignor of one-half to Bertram Wahl, Moss, Norway
Filed July 15, 1963, Ser. No. 294,959
Claims priority, application Norway, July 16, 1962, 145,119
14 Claims. (Cl. 73—299)

The present invention relates to a liquid volume measuring arrangement. More particularly, the invention relates to a liquid volume measuring arrangement comprising a buoyant body immersed in liquid in a tank, the weight of the buoyant body, reduced by its buoyancy in the liquid, being indicated by a measuring instrument as an indication of the volume of liquid in the tank.

If a measuring arrangement of the type described is used in tanks containing heavier fuel oils, lubricating oils and similar oils, the buoyant body will be coated with the liquid in the tank and will cause erroneous measurements of liquid volume. An object of the present invention is thus to eliminate this disadvantage.

In accordance with the present invention a pressure sensitive device or bellows transmits a pressure variation to a pressure indicator or manometer. A buoyant body is coupled to the bellows and extends into the tank, containing the liquid whose volume is to be measured, below the level of the liquid to be measured in the tank. The buoyant body applies a force to the bellows to produce a pressure variation which is indicated by the manometer, the force having a determined relation to the volume of the liquid to be measured in the tank. An auxiliary liquid which is non-adherent to the buoyant body is provided and maintained at the level of the liquid to be measured in the area of the buoyant body and in contact with the buoyant body.

In accordance with the present invention, a buoyant body is suspended in a divided chamber in a tank. In its lower part, near the bottom of the tank, the chamber communicates with a compartment containing an auxiliary liquid which does not deposit any noticeable coating on the buoyant body. The auxiliary liquid is immiscible with and is heavier than the liquid in the tank. The chamber communicates with the tank in such a manner that a part of the tank liquid will flow into the chamber and lie upon the heavier auxiliary liquid and force the auxiliary liquid up into the divided chamber, in which the buoyant body is located thus giving said body a buoyancy proportional to the liquid column resting on the auxiliary liquid.

The process of the present invention for measuring the volume of a liquid in a tank comprises the steps of transmitting a pressure variation from a pressure sensitive device or bellows to a pressure indicator or manometer, coupling a buoyant body to the bellows and extending the buoyant body into the tank below the level of a liquid to be measured in the tank, applying a force having a determined relation to the volume of the liquid to be measured in the tank to the bellows via the buoyant body to produce a pressure variation which is indicated by the manometer, and providing and maintaining at the level of the liquid to be measured in the area of the buoyant body and in contact with the buoyant body an auxiliary liquid which is non-adherent to the buoyant body.

Since an auxiliary liquid which is immiscible with the tank liquid and heavier than such tank liquid is water, water is preferably used in connection with mineral oil and similar products. Water does not coat the buoyant body to make the measurement inaccurate and does not otherwise cause any complications.

In order that the present invention may be readily carried into effect, it will now be described with reference to the drawing, wherein the single figure is a section of an embodiment of the liquid volume measuring arrangement of the present invention.

In the figure, the tank has a bottom 1 and a top 2. A buoyant body 3 is permanently suspended and at its upper part is connected to a bolt 4. The bolt 4 supports a plate or a spider 5 with downwardly pointing pins 6 and 7 each resting on a corresponding pressure sensitive device or bellows 8 and 9, respectively. Each of the bellows 8 and 9 defines, together with a corresponding pressure container 11 and 12, respectively, a closed chamber communicating with a common tube 13. The tube 13 is connected to a pressure indicator or manometer 14 which may be graduated in volume units, such as liters.

The buoyant body 3 is positioned in a tube 15 in the tank. The tube 15 has at its top a circumferential flange 16 which suspends the tube in the tank via a flexible packing 17 positioned on the top 2 of the tank. The opening in the top 2 of the tank through which the tube 15 extends, the pressure containers 11 and 12, the plate 5, the packings 17, etc., are covered by a housing 18 bolted to the tank top, as shown.

A chamber 19 is connected to the lower part of the tube 15 and communicates with the interior of the tube through a plurality of openings 21 formed through said tube adjacent the bottom end of said tube. The tube 15 is welded to the bottom 22 of the chamber 19 as indicated at point 23. The chamber 19 is fixedly connected to the bottom 1 of the tank by short metal members 24.

The chamber 19 is divided by a horizontal partition wall 25 into two compartments 26 and 27. Directly beneath the underside of the partition wall 25, the lower compartment 27 has a plurality of openings 28 formed therethrough opening said compartment to the tank. The upper compartment 26 is in communication with the lower compartment 27 through a plurality of substantially vertical tubes 29 extending through and welded to the partition wall 25 and ending adjacent the bottom 22 of the chamber 19.

The interior of the tube 15 has radial, inwardly directed projections 31 which serve as supports for the buoyant body 3 during the installation of the measuring arrangement. The upper compartment 26 of the chamber 19 is equipped with an inlet opening 32 having a plug 33. Ears 34 and 35 are welded to the upper or top wall 36 of the chamber 19 to enable the suspending of said chamber and the tube 15 by wires (not shown) during installation. Near its top and adjacent the top 2 of the tank the tube 15 has a plurality of openings 37 formed therethrough through which any overpressure and underpressure arising in the tank may be equalized to prevent it from influencing the measuring results.

The lowest or zero level 38 is the oil level from which the metering of the volume of oil in the tank starts. The level 38 is at the same height as the lower edge of the openings 28. An auxiliary liquid is provided inside the chamber 19 as hereinafter described. The initial level 39 of the auxiliary liquid is the same as the zero level 38 of the oil.

To facilitate the explanation of the operation of the liquid volume measuring arrangement of the present invention, it is assumed that the tank contains oil having a specific gravity of 0.9 kg./dm.$^3$, such as lubricating oil, and that the auxiliary liquid is water, the specifis gravity of which may be assumed to be constant at 1 kg./dm.$^3$.

When the two compartments 26 and 27 of the chamber 19 are to be filled, all the openings 28 except one are closed, whereupon said chamber is filled with water through the inlet opening 32 until it overflows through the one open opening 28. Then the one open opening 28 is closed and the remainder of the chamber 19 is filled up.

The water then rises to a certain level in the upper compartment 26, but there is an airfilled space between the water level 39 and the partition wall 25. The plug 33 is then inserted and all the stoppers are removed from the openings 28. The liquid volume measuring arrangement is then ready for use.

If, to start with, the tank is completely empty, it is initially filled with oil up to the level 38 without this having any effect upon the buoyant body 3, which remains in the zero position shown in the figure. The manometer 14 connected to the tube 13 at such time reads zero. During the continued flow of oil into the tank, the level will rise, such as, for example, to 10 meters above the zero level 38. The volume of oil having entered the lower compartment 27 of the chamber 19 through the openings 28 then exerts a pressure on the water surface of 0.9 kg./cm.² Simultaneously, water flows under the pressure of the oil on it through the holes 21 and up into the space between the buoyant body 3 and the tube 15. The water adjusts itself, in the present example, at a height of 9 meters above the zero level 38. The oil pressure and the water pressure at the zero level 38 in the tube 15 and in the tank is the same at 0.9 kg./cm.²

The volume of water flowing into the tube 15 under the pressure of the oil on it and remaining between the inner wall of said tube and the buoyant body 3 during the flow of oil into the tank, is replaced in the lower compartment 27 by oil. Because of the ratio between the cross-sectional area of the annular space between the tube 15 and the buoyant body 3, and the cross-sectional area of the chamber 19, the volume of this oil is very small, and if the various dimensions of the measuring arrangement are suitably selected, such oil will not cause any inaccuracy in the measurement results as compared with the inaccuracies which would result from the coating of the buoyant body with oil.

The water in the upper compartment 26 of the chamber 19 serves only to replace the amount of water escaping through the tube 15 by vaporization. Because of the small cross-sectional area of the space between the tube 15 and the buoyant body 3 the vaporization is very small. Replenishment of the water in the lower compartment 27 occurs only when the water level decreases below the level 41 defined by the lower ends of the tubes 29. The oil will then force its way into the upper compartment 26 and replace the water there. This, however, has no effect on the accuracy of the measuring result. The upper compartment 26 of the chamber 19 thus functions as a reserve tank for the auxiliary liquid.

The tank may have a plurality of horizontal interior cross-sectional areas at different elevations and the liquid on the tank, whose volume is to be measured, has a surface area at each elevation corresponding to the horizontal cross-sectional area of the tank at such elevation. The buoyant body, which is suspended substantially vertically in the container, may have a plurality of horizontal cross-sectional areas at the different elevations each having a fixed proportional relationship to the surface area of the liquid at each level of liquid in the tank, so that the net weight of the buoyant body varies in the same relation as the volume of liquid in the tank. The buoyant may comprise a sheet having a form which is equivalent in size and shape to the vertical interior cross-sectional area of the tank.

It will be understood that each of the elements described above, or two or more together, may also find a useful application in other types of liquid volume measuring arrangements differing from the types described above.

While the invention has been illustrated and described as embodied in liquid volume measuring arrangements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characeristics of the generic or specific aspects of this invention and, therefore, such adaptations should and are intended to be comprehended within the meaning and range of equivalence of the following claims.

What is claimed as new and desired to be secured by Letters Patent is:

1. A liquid volume measuring arrangement for measuring the volume of a liquid in a tank comprising, in combination, pressure indicating means;

pressure sensitive means for transmitting a pressure variation to said pressure indicating means;

buoyant means coupled to said pressure sensitive means and extending into said tank below the level of a liquid to be measured in said tank for applying a force to said pressure sensitive means to produce a pressure variation which is indicated by said pressure indicating means, said force having a determined relation to the volume of the liquid to be measured in said tank; and auxiliary means for providing and maintaining at the level of the liquid to be measured in the area of said buoyant means and in contact with said buoyant means an auxiliary liquid which is non-adherent to said buoyant means.

2. A liquid volume measuring arrangement for measuring the volume of a liquid in a tank comprising, in combination, pressure indicating means;

pressure sensitive means for transmitting a pressure variation to said pressure indicating means;

a tube positioned in said tank and extending from the top to the bottom of said tank in a substantially vertical direction;

buoyant means coupled to said pressure sensitive means and extending into said tube in said tank below the level of a liquid to be measured in said tank for applying a force to said pressure sensitive means to produce a pressure variation which is indicated by said pressure indicating means, said force having a determined relation to the volume of the liquid to be measured in said tank; and auxiliary means for providing and maintaining in said tube at the level of the liquid to be measured in said tank and in contact with said buoyant means an auxiliary liquid which is non-adherent to said buoyant means.

3. A liquid volume measuring arrangement for measuring the volume of a liquid in a tank comprising, in combination, pressure indicating means;

pressure sensitive means for transmitting a pressure variation to said pressure indicating means;

a tube positioned in said tank and extending from the top to the bottom of said tank in a substantially vertical direction;

buoyant means coupled to said pressure sensitive means and extending into said tube in said tank below the level of a liquid to be measured in said tank for applying a force to said pressure sensitive means to produce a pressure variation which is indicated by said pressure indicating means, said force having a determined relation to the volume of the liquid to be measured in said tank; and auxiliary means utilizing the liquid to be measured for providing and maintaining in said tube at the level of the liquid to be measured in said tank and in contact with said buoyant means an auxiliary liquid which is non-adherent to said buoyant means.

4. A liquid volume measuring arrangement for measuring the volume of a liquid in a tank comprising, in combination,
  pressure indicating means;
  pressure sensitive means for transmitting a pressure variation to said pressure indicating means;
  a tube positioned in said tank and extending from the top to the bottom of said tank in a substantially vertical direction;
  buoyant means coupled to said pressure sensitive means and extending into said tube in said tank below the level of a liquid to be measured in said tank for applying a force to said pressure sensitive means to produce a pressure variation which is indicated by said pressure indicating means, said force having a determined relation to the volume of the liquid to be measured in said tank; and
  auxiliary means utilizing the liquid to be measured for providing and maintaining in said tube at the level of the liquid to be measured in said tank and in contact with said buoyant means an auxiliary liquid which is non-adherent to said buoyant means, said auxiliary means comprising a chamber for storing said auxiliary liquid, said chamber communicating with said tube and with said tank.

5. A liquid volume measuring arrangement for measuring the volume of a liquid in a tank comprising, in combination,
  pressure indicating means;
  pressure sensitive means for transmitting a pressure variation to said pressure indicating means;
  a tube positioned in said tank and extending from the top to the bottom of said tank in a substantially vertical direction;
  buoyant means coupled to said pressure sensitive means and extending into said tube in said tank below the level of a liquid to be measured in said tank for applying a force to said pressure sensitive means to produce a pressure variation which is indicated by said pressure indicating means, said force having a determined relation to the volume of the liquid to be measured in said tank; and
  auxiliary means utilizing the liquid to be measured for providing and maintaining in said tube at the level of the liquid to be measured in said tank and in contact with said buoyant means an auxiliary liquid which is heavier than the liquid to be measured and non-adherent to said buoyant means, said auxiliary means comprising a chamber for storing said auxiliary liquid, said chamber comprising a compartment for storing said auxiliary liquid and another compartment communicating with said first-mentioned compartment and with said tube and with said tank for storing both a part of said liquid to be measured and a part of said auxiliary liquid in a manner whereby said liquid to be measured provides pressure on said auxiliary liquid to cause said auxiliary liquid to flow into said tube to the level of the liquid to be measured in said tank.

6. A liquid volume measuring arrangement for measuring the volume of a liquid in a tank comprising, in combination,
  pressure indicating means;
  pressure sensitive means for transmitting a pressure variation to said pressure indicating means;
  a tube positioned in said tank and extending from the top to the bottom of said tank in a substantially vertical direction, said tube having a plurality of openings formed therethrough adjacent the bottom thereof;
  buoyant means coupled to said pressure sensitive means and extending into said tube in said tank below the level of a liquid to be measured in said tank for applying a force to said pressure sensitive means to produce a pressure variation which is indicated by said pressure indicating means, said force having a determined relation to the volume of the liquid to be measured in said tank; and
  auxiliary means utilizing the liquid to be measured for providing and maintaining in said tube at the level of the liquid to be measured in said tank and in contact with said buoyant means an auxiliary liquid which is heavier than the liquid to be measured and non-adherent to said buoyant means, said auxiliary means comprising a chamber positioned around said tube at the bottom of said tank and covering the openings adjacent the bottom of said tube, said chamber comprising a compartment for storing said auxiliary liquid and another compartment around said openings in said tube communicating with said first-mentioned compartment and having openings formed therethrough to said tank for storing both a part of said liquid to be measured and a part of said auxiliary liquid in a manner whereby said liquid to be measured provides pressure on said auxiliary liquid to cause said auxiliary liquid to flow into said tube via said openings in said tube to the level of the liquid to be measured in said tank.

7. A liquid volume measuring arrangement for measuring the volume of a liquid in a tank comprising, in combination,
  pressure indicating means;
  pressure sensitive means for transmitting a pressure variation to said pressure indicating means;
  a tube positioned in said tank and extending from the top to the bottom of said tank in a substantially vertical direction, said tube having a plurality of openings formed therethrough adjacent the bottom thereof;
  buoyant means coupled to said pressure sensitive means and extending into said tube in said tank below the level of a liquid to be measured in said tank for applying a force to said pressure sensitive means to produce a pressure variation which is indicated by said pressure indicating means, said force having a determined relation to the volume of the liquid to be measured in said tank; and
  auxiliary means utilizing the liquid to be measured for providing and maintaining in said tube at the level of the liquid to be measured in said tank and in contact with said buoyant means an auxiliary liquid which is heavier than the liquid to be measured and non-adherent to said buoyant means, said auxiliary means comprising a chamber positioned around said tube at the bottom of said tank and covering the openings adjacent the bottom of said tube, said chamber comprising an upper compartment for storing said auxiliary liquid and a lower compartment around said openings in said tube formed by a substantially horizontal partition having openings formed therethrough and tubes extending from the openings formed through said partition into the lower compartment, said lower compartment having openings formed therethrough to said tank in a manner whereby said auxiliary liquid enters said lower compartment through the tubes extending from the partition forming said upper and lower compartments and said liquid to be measured enters said lower compartment through the openings formed therethrough with said liquid to be measured on said auxiliary liquid and causing the said auxiliary liquid to flow into said tube via said openings in said tube to the level of the liquid to be measured in said tank.

8. A liquid volume measuring arrangement as claimed in claim 7, wherein said tube positioned in said tank has an upper end supported outside said tank and a lower end affixed to the bottom of said chamber.

9. A liquid volume measuring arrangement as claimed in claim 7, wherein said tube positioned in said tank has an upper end extending outside said tank and a lower end affixed to the bottom of said chamber, further comprising substantially flexible supporting means supporting said tube outside the tank at the upper end thereof.

10. A liquid volume measuring arrangement as claimed in claim 7, wherein said chamber has a top having an inlet opening formed therethrough for said auxiliary liquid and a bottom affixed to the bottom of said tank.

11. A process for measuring the volume of a liquid in a tank, comprising the steps of
- transmitting a pressure variation from a pressure sensitive means to a pressure indicating means;
- coupling buoyant means to said pressure sensitive means and extending said buoyant means into said tank below the level of a liquid to be measured in said tank;
- applying a force having a determined relation to the volume of the liquid to be measured in said tank to said pressure sensitive means via said buoyant means to produce a pressure variation which is indicated by said pressure indicating means; and
- providing and maintaining at the level of the liquid to be measured in the area of said buoyant means and in contact with said buoyant means an auxiliary liquid which is non-adherent to said buoyant means.

12. A process for measuring the volume of a liquid in a tank, comprising the steps of
- transmitting a pressure variation from a pressure sensitive means to a pressure indicating means;
- positioning a tube in said tank extending from the top to the bottom of said tank in a substantially vertical direction;
- coupling buoyant means to said pressure sensitive means and extending said buoyant means into said tube in said tank below the level of a liquid to be measured in said tank;
- applying a force having a determined relation to the volume of the liquid to be measured in said tank to said pressure sensitive means via said buoyant means to produce a pressure variation which is indicated by said pressure indicating means; and
- providing and maintaiinng in said tube at the level of the liquid to be measured in said tank and in contact with said buoyant means an auxiliary liquid which is non-adherent to said buoyant means.

13. A process for measuring the volume of a liquid in a tank, comprising the steps of
- transmitting a pressure variation from a pressure sensitive means to a pressure indicating means;
- positioning a tube in said tank extending from the top to the bottom of said tank in a substantially vertical direction;
- coupling buoyant means to said pressure sensitive means and extending said buoyant means into said tube in said tank below the level of a liquid to be measured in said tank;
- applying a force having a determined relation to the volume of the liquid to be measured in said tank to said pressure sensitive means via said buoyant means to produce a pressure variation which is indicated by said pressure indicating means; and
- utilizing the liquid to be measured for providing and maintaining in said tube at the level of the liquid to be measured in said tank and in contact with said buoyant means an auxiliary liquid which is non-adherent to said buoyant means.

14. A process for measuring the volume of a liquid in a tank, comprising the steps of
- transmitting a pressure variation from a pressure sensitive means to a pressure indicating means;
- positioning a tube in said tank extending from the top to the bottom of said tank in a substantially vertical direction;
- coupling buoyant means to said pressure sensitive means and extending said buoyant means into said tube in said tank below the level of a liquid to be measured in said tank;
- applying a force having a determined relation to the volume of the liquid to be measured in said tank to said pressure sensitive means via said buoyant means to produce a pressure variation which is indicated by said pressure indicating means;
- storing an auxiliary liquid which is non-adherent to said buoyant means in a chamber communicating with said tube and with said tank; and
- utilizing the liquid to be measured in said chamber for providing and maintaining in said tube at the level of the liquid to be measured in said tank and in contact with said buoyant means said auxiliary liquid.

References Cited in the file of this patent

UNITED STATES PATENTS

| | | |
|---|---|---|
| 1,442,134 | Dunajeff | Jan. 16, 1923 |
| 1,590,287 | De Giers | June 29, 1926 |
| 1,725,705 | Eynon | Aug. 29, 1929 |
| 1,864,991 | Eynon | June 28, 1932 |